(12) United States Patent
Idaka

(10) Patent No.: US 10,440,441 B2
(45) Date of Patent: Oct. 8, 2019

(54) IMAGE PICKUP APPARATUS, IMAGE PICKUP SYSTEM, CONTROL METHOD FOR IMAGE PICKUP APPARATUS, AND RECORDING MEDIUM

(71) Applicant: CANON KABUSHIKI KAISHA, Tokyo (JP)

(72) Inventor: Sayuri Idaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 14/533,960

(22) Filed: Nov. 5, 2014

(65) Prior Publication Data
US 2015/0135248 A1 May 14, 2015

(30) Foreign Application Priority Data
Nov. 8, 2013 (JP) .................................. 2013-232393

(51) Int. Cl.
*H04N 21/6371* (2011.01)
*H04N 21/218* (2011.01)
(Continued)

(52) U.S. Cl.
CPC ..... *H04N 21/6371* (2013.01); *H04N 21/2187* (2013.01); *H04N 21/21815* (2013.01);
(Continued)

(58) Field of Classification Search
CPC .. H04N 21/225; H04N 21/231; H04N 21/232; H04N 21/47202; H04N 21/2387; H04N 21/4333; H04N 21/47205; H04N 21/47217; H04N 21/6587; H04B 7/2121; H04B 7/2123; H04J 2203/0069; H04Q 2213/394; H04W 72/04; H04W 72/12
See application file for complete search history.

(56) References Cited

U.S. PATENT DOCUMENTS 7,889,203 B2 * 2/2011 Schmieder ............ G06F 3/1438
345/418
2002/0062407 A1 * 5/2002 Tateyama .............. G06F 3/1209
710/11
(Continued)

FOREIGN PATENT DOCUMENTS

CN 101018140 A 8/2007
CN 101075968 A 11/2007
(Continued)

*Primary Examiner* — Joshua D Taylor
*Assistant Examiner* — Adil Ocak
(74) *Attorney, Agent, or Firm* — Canon U.S.A., Inc. IP Division

(57) ABSTRACT

An image pickup apparatus includes a storage unit configured to store a first protocol and a first capability information in a memory, the first capability information being associated with the first protocol as a capability information and also store a second protocol and second capability information in the memory, the second capability information being associated with the second protocol as the capability information, a reception unit configured to receive a command for requesting the capability information from the external apparatus via the network, a determination unit configured to determine whether the received command is in conformity to the first protocol or the second protocol, a reading unit configured to read out the first or second capability information associated with the protocol determined by the determination unit from the memory, and a transmission unit configured to transmit the read capability information to the external apparatus via the network.

21 Claims, 7 Drawing Sheets

(51) Int. Cl.
*H04N 21/2743* (2011.01)
*H04N 21/239* (2011.01)
*H04N 21/2187* (2011.01)
*H04N 21/643* (2011.01)
*H04N 21/654* (2011.01)
*H04N 21/658* (2011.01)
*H04N 21/84* (2011.01)

(52) U.S. Cl.
CPC ....... *H04N 21/239* (2013.01); *H04N 21/2743* (2013.01); *H04N 21/64322* (2013.01); *H04N 21/654* (2013.01); *H04N 21/658* (2013.01); *H04N 21/84* (2013.01)

(56) References Cited

U.S. PATENT DOCUMENTS

| | | | | |
|---|---|---|---|---|
| 2005/0030375 | A1* | 2/2005 | Zangrande | H04N 1/00127 348/143 |
| 2006/0246947 | A1* | 11/2006 | Fujii | H04W 28/18 455/557 |
| 2007/0157260 | A1* | 7/2007 | Walker | 725/86 |
| 2007/0157281 | A1* | 7/2007 | Ellis | H04N 7/17309 725/134 |
| 2008/0022322 | A1* | 1/2008 | Grannan | H04N 5/44591 725/78 |
| 2010/0061316 | A1* | 3/2010 | Levenshteyn et al. | 370/329 |
| 2015/0033275 | A1* | 1/2015 | Natani | H04N 21/42225 725/110 |

FOREIGN PATENT DOCUMENTS

| | | |
|---|---|---|
| CN | 101371528 A | 2/2009 |
| CN | 101480013 A | 7/2009 |
| CN | 102025783 A | 4/2011 |
| CN | 102932351 A | 2/2013 |
| JP | 2005-323007 A | 11/2005 |

* cited by examiner

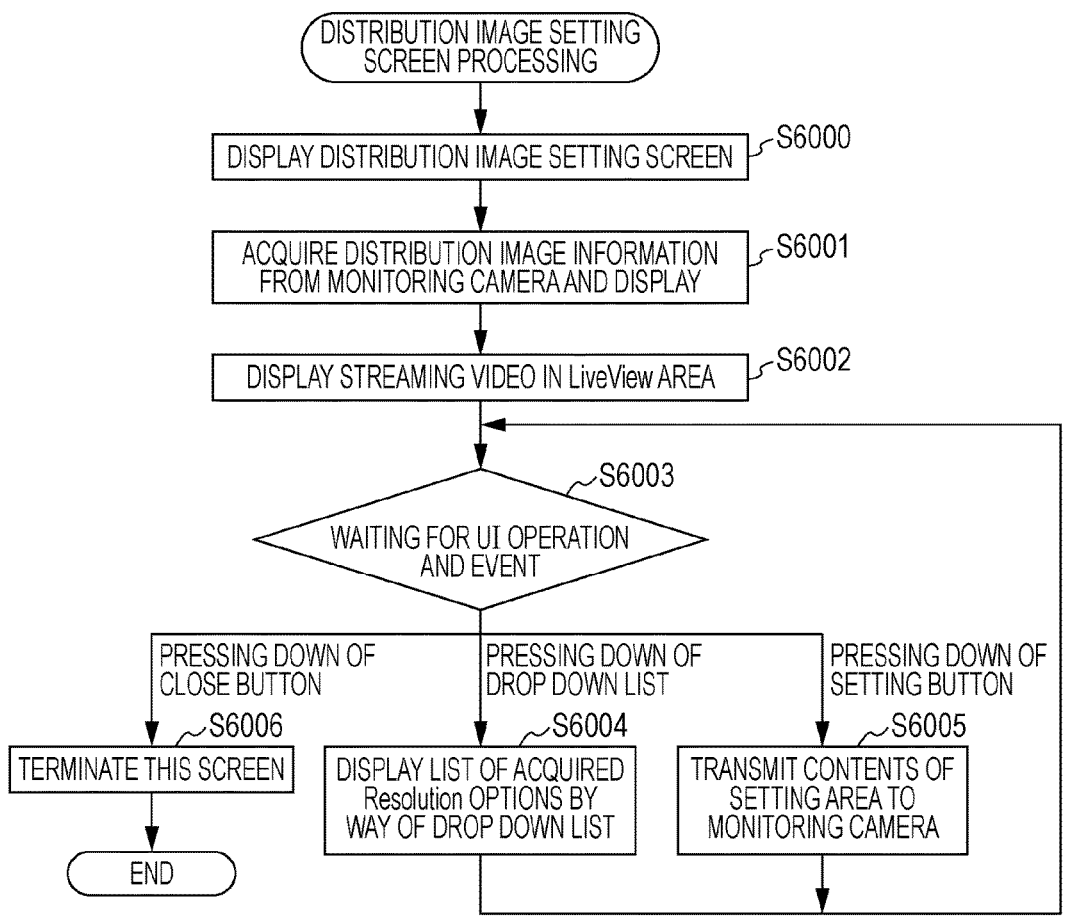

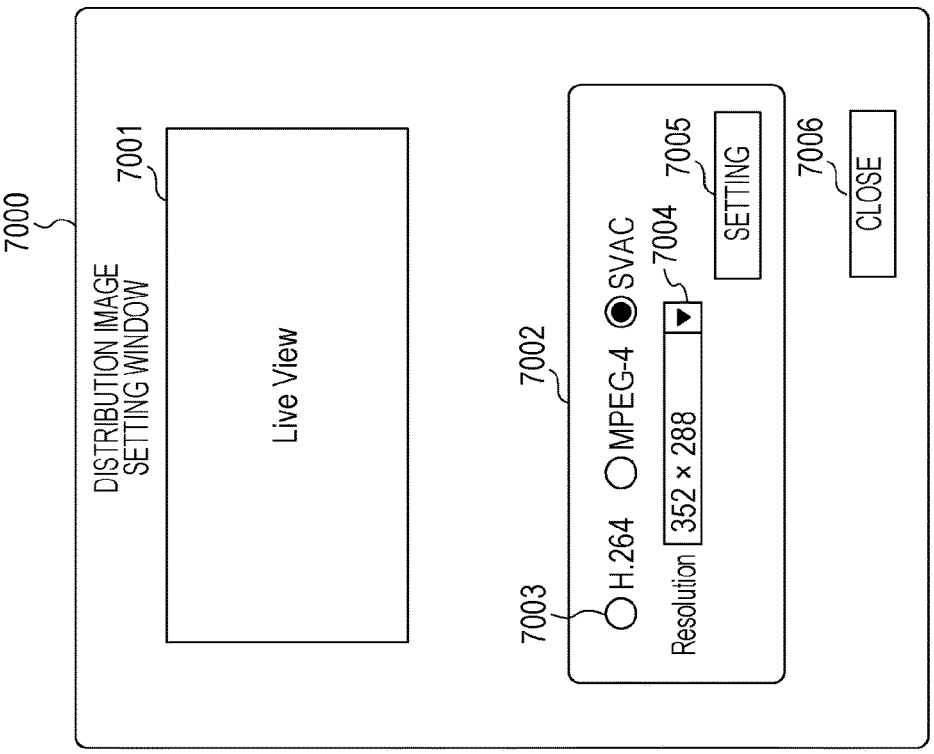
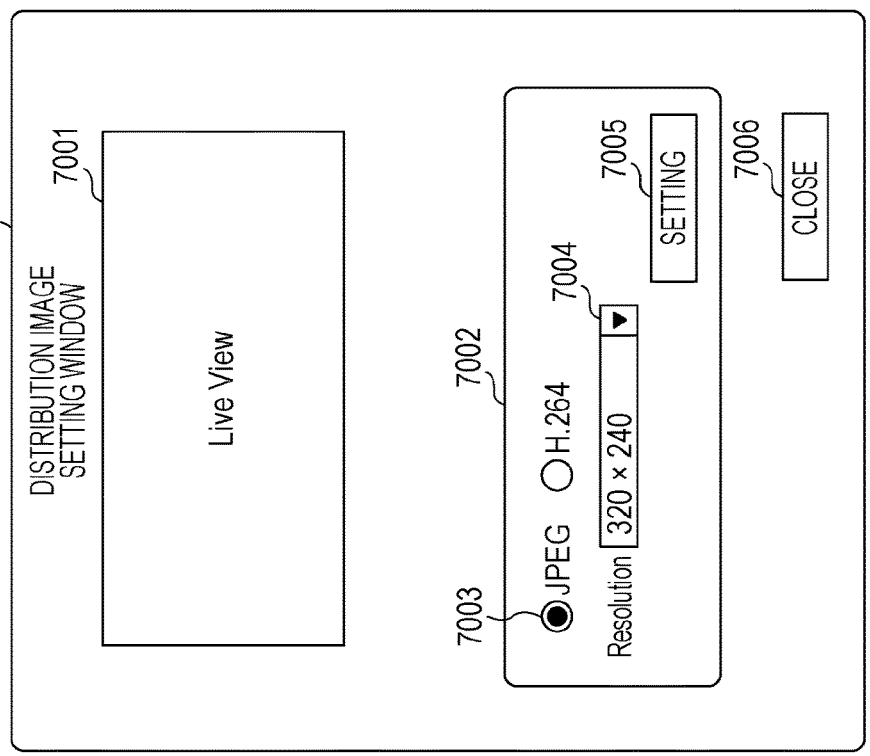

IMAGE PICKUP APPARATUS, IMAGE PICKUP SYSTEM, CONTROL METHOD FOR IMAGE PICKUP APPARATUS, AND RECORDING MEDIUM

BACKGROUND

Technical Field

The present disclosure relates to an image pickup apparatus, an image pickup system, a control method for the image pickup apparatus, a control method for the image pickup system, and a recording medium. The disclosure particularly relates to a technology for transmitting a setting of an image distributed to an external apparatus to the external apparatus.

Description of the Related Art

Up to now, a command group for changing a setting of an image pickup apparatus from an external apparatus and a command group for instructing distribution start of a picked-up image from the external apparatus are implemented in the image pickup apparatus that distributes the picked-up image to the external apparatus.

In these days, as an example of the above-described command group, a protocol established by Open Network Video Interface Forum (ONVIF) has been proposed.

The above-described command group includes a command for changing a resolution of a picked-up image generated by an image pickup unit of an image pickup apparatus from an external apparatus. In addition, the above-described command group includes a command for changing a compression encoding system at a time when a compression encoding unit of the image pickup apparatus performs compression encoding of this picked-up image (JPEG, H.264, or the like).

For example, according to the protocol established by ONVIF, SetVideoSourceMode command is defined as the former command, and SetVideoEncoderConfiguration command is defined as the latter command.

Furthermore, in recent years, a standard called GB/T28181 (hereinafter, which may be referred to as GB28181) which is related to a network system of video monitoring has also been established as a national standard of China.

In addition, up to now, protocols other than the protocols established by ONVIF or GB28181 have been also proposed.

Japanese Patent Laid-Open No. 2005-323007 discloses a recording and reproducing apparatus that controls a compression decompression unit configured to compress or decompress video signals output from a camera image pickup unit on the basis of image pickup management information transmitted from an external communication device. However, this image pickup management information transmitted from the external communication device is not limited to information in conformity to the protocols established by ONVIF or GB28181.

Incidentally, the above-described image pickup apparatus can communicate with a plurality of external apparatuses via a network. Furthermore, in years to come, each of commands transmitted from each of the plurality of external apparatuses to the image pickup apparatus may not follow the same protocol, and a case where these commands follow mutually different protocols is conceivable.

However, a response of the image pickup apparatus in the related art to the command from the external apparatus is the same irrespective of the protocol followed by this command. For that reason, even when the image pickup apparatus in the related art transmits a compression encoding system, a resolution, and the like of the picked-up image to the external apparatus as the response, the protocol used in a communication by this external apparatus may not correspond to the compression encoding system, the resolution, and the like.

For this reason, a user that operates the external apparatus may not select an appropriate compression encoding system and the like in accordance with the protocol used in the communication by this external apparatus in some cases. As a result, the external apparatus may not display the picked-up image distributed from the image pickup apparatus in some cases.

The present invention has been made in view of the above-described problems and makes it possible to transmit the setting of the picked-up image distributed to the external apparatus to the external apparatus, which is the appropriate setting of the picked-up image in accordance with the protocol followed by the command received from the external apparatus.

SUMMARY

To address the above-described problems, an image pickup apparatus according to an aspect of the present invention is an image pickup apparatus that communicates with an external apparatus via a network, the image pickup apparatus including: a storage unit configured to store a first protocol and a first capability information in a memory, the first capability information being associated with the first protocol as a capability information and also store a second protocol different from the first protocol and second capability information different from the first capability information in the memory, the second capability information being associated with the second protocol as the capability information; a reception unit configured to receive a command for requesting the capability information from the external apparatus via the network; a determination unit configured to determine whether the command received by the reception unit is in conformity to the first protocol or the second protocol; a reading unit configured to read out the first or second capability information associated with the protocol determined by the determination unit from the memory; and a transmission unit configured to transmit the capability information read by the reading unit to the external apparatus via the network.

Further features of the present invention will become apparent from the following description of exemplary embodiments with reference to the attached drawings.

BRIEF DESCRIPTION OF THE DRAWINGS

FIG. 6 is a flow chart for describing distribution image setting screen processing according to the first exemplary embodiment of the present invention.

FIGS. 7A and 7B illustrate example distribution image setting screens according to the first exemplary embodiment of the present invention.

DESCRIPTION OF THE EMBODIMENTS

Hereinafter, exemplary embodiments of the present invention will be described in detail with reference to the accompanying drawings. It is noted that configurations according to the following exemplary embodiments are merely examples, and the present invention is not limited to the illustrated configurations.

First Exemplary Embodiment

Figure 1:
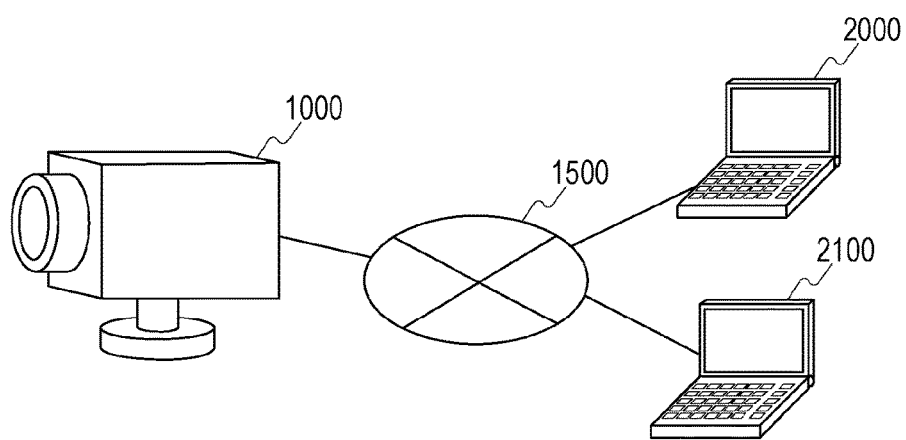
FIG. 1 illustrates an example system configuration of a monitoring system according to a first exemplary embodiment of the present invention.

A network configuration will be hereinafter described by referring to FIG. 1 according to the present exemplary embodiment. More specifically, FIG. 1 illustrates an example system configuration of a monitoring system according to the present exemplary embodiment.

A monitoring camera 1000 configured to pick up a video image, a client apparatus 2000, and a client apparatus 2100 are connected to each other via an IP network 1500 (via a network) so as to be communicable to each other in the monitoring system according to the present exemplary embodiment. Accordingly, the monitoring camera 1000 can distribute a picked-up image via the IP network 1500 to the client apparatus 2000 and the client apparatus 2100.

Each of the client apparatus 2000 and the client apparatus 2100 according to the present exemplary embodiment is an example of an external apparatus such as a PC. The monitoring system according to the present exemplary embodiment is equivalent to an image pickup system.

The IP network 1500 is constituted by a plurality of routers, switches, cables, and the like that satisfy a communication standard such as, for example, Ethernet (registered trademark). However, according to the present exemplary embodiment, any communication standard, scale, and configuration may be employed so long as the communication between the monitoring camera 1000 and the client apparatus 2000 and the client apparatus 2100 can be performed.

For example, the IP network 1500 may be constituted by the internet, a wired local area network (LAN), a wireless LAN, a wide area network (WAN), or the like. The monitoring camera 1000 according to the present exemplary embodiment may correspond, for example, to Power Over Ethernet (registered trademark) (PoE), or power may be supplied to the monitoring camera 1000 via a LAN cable.

Each of the client apparatus 2000 and the client apparatus 2100 transmits various commands to the monitoring camera 1000. These commands include, for example, a command for instructing a change of a compression encoding system of the monitoring camera 1000 and a command for starting streaming distribution of video, audio, or the like.

On the other hand, the monitoring camera 1000 transmits responses to these commands to the client apparatus 2000 and the client apparatus 2100. The monitoring camera 1000 also starts streaming distribution of video, audio, or the like to the client apparatus 2000 and the client apparatus 2100.

Figure 2A:
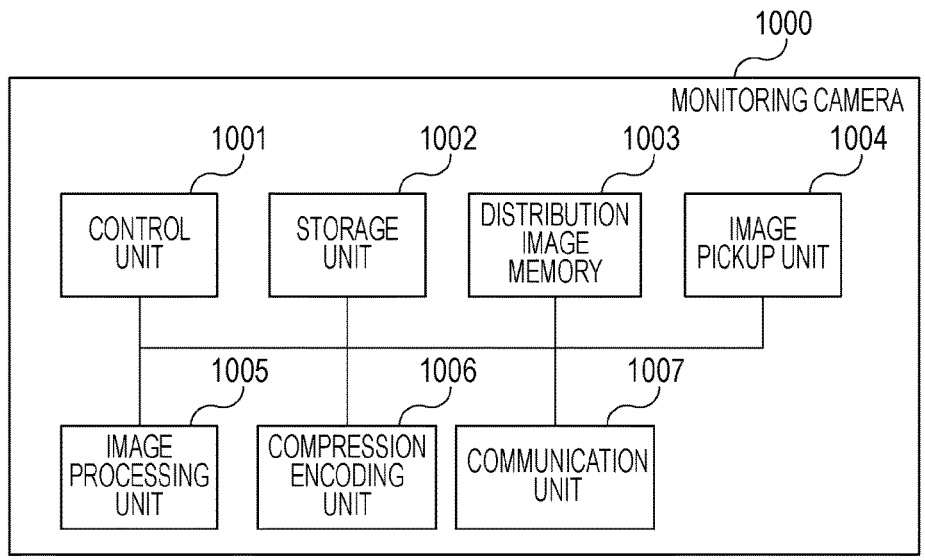
FIGS. 2A and 2B illustrate example hardware configurations of a monitoring camera as well as client apparatuses according to the first exemplary embodiment of the present invention.
Figure 2B:
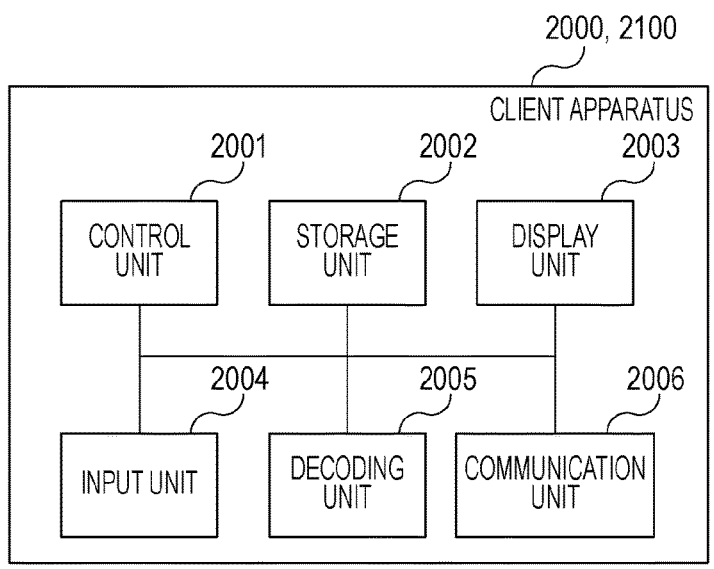

Subsequently, FIGS. 2A and 2B illustrate example hardware configurations of the monitoring camera 1000 as well as the client apparatus 2000 and the client apparatus 2100 according to the present exemplary embodiment. FIG. 2A illustrates an example hardware configuration of the monitoring camera 1000 according to the present exemplary embodiment.

A control unit 1001 in FIG. 2A performs overall control of the monitoring camera 1000. The control unit 1001 is constituted, for example, by a central processing unit (CPU) and executes a program stored in a storage unit 1002 which will be described below. The control unit 1001 may perform the control by using hardware. The control unit 1001 according to the present exemplary embodiment is provided with a storage control function for storing information in the storage unit 1002.

The storage unit 1002 is constituted by a hard disc, a flash memory, or the like. The storage unit 1002 is used as various data storage areas such as a storage area for the program mainly executed by the control unit 1001, a work area for various setting values and a currently executed program, and a storage area for a picked-up image generated by an image pickup unit 1004 which will be described below.

For example, the storage unit 1002 stores a compression encoding system table in which communication protocol information indicating a communication protocol and compression encoding system information indicating a compression encoding system are associated with each other. A distribution image memory 1003 is a storage area for temporarily saving image data on which compression encoding has been performed by a compression encoding unit 1006 which will be described below.

The image pickup unit 1004 picks up an image of a subject that has been focused by an image pickup optical system (not illustrated) of the monitoring camera 1000. The image pickup unit 1004 also generates an analog signal through this image pickup. The image pickup unit 1004 then converts the generated analog signal into a digital signal. Next, the image pickup unit 1004 outputs the converted digital signal to the storage unit 1002 as a picked-up image.

The image processing unit 1005 performs image processing on the picked-up image output from the image pickup unit 1004 on the basis of a content of an image processing setting. For example, an image processing unit 1005 performs inversion processing for inverting the picked-up image output from the image pickup unit 1004.

The compression encoding unit 1006 performs compression encoding processing such as JPEG or H.264 on the picked-up image output from the image processing unit 1005 on the basis of a content of a compression encoding setting. The compression encoding unit 1006 outputs the picked-up image on which the compression encoding processing has been performed to the distribution image memory 1003.

A communication unit 1007 is used for data exchange with respect to the client apparatus 2000 and the client apparatus 2100. For example, the communication unit 1007 receives request commands from the client apparatus 2000 and the client apparatus 2100 via the IP network 1500. The communication unit 1007 then outputs the received request commands to the control unit 1001.

The communication unit 1007 also receives an instruction of the control unit 1001 and transmits the response output from the control unit 1001 to the client apparatus 2000 and the client apparatus 2100 via the IP network 1500. In this manner, the monitoring camera 1000 can perform the communication with the client apparatus 2000 and the client apparatus 2100 via the network by the communication unit 1007.

Subsequently, FIG. 2B illustrates an example hardware configuration of the client apparatus 2000 according to the present exemplary embodiment. It is noted that the respective constituting elements of the client apparatus 2100 are the same as the respective constituting elements of the client apparatus 2000, and therefore descriptions thereof will be omitted. The client apparatus 2000 and the client apparatus 2100 according to the present exemplary embodiment are constituted as computer apparatuses connected to the IP network 1500.

A control unit 2001 performs overall control of the client apparatus 2000. The control unit 2001 is constituted, for example, by a CPU and executes a program stored in a storage unit 2002. The control unit 2001 may perform the control by using hardware. The storage unit 2002 is used as a storage area for the program executed by the control unit 2001, a work area for a currently executed program, and a data storage area.

A display unit 2003 is constituted, for example, by an LCD, an organic EL display, or the like. The display unit 2003 is configured to display information for a user of the client apparatus 2000. Specifically, the display unit 2003 displays various setting screens including a distribution image setting screen which will be described below, live video distributed by way of streaming from the monitoring camera 1000, various messages, and the like.

An input unit 2004 is constituted, for example, by a button, a four-way operational key, a touch panel, a mouse, and the like. The input unit 2004 accepts an input of an instruction from the user.

For example, the input unit 2004 can accept inputs of transmission instructions of various commands with respect to the monitoring camera 1000 as the instructions from the user. The input unit 2004 can also accept an input of a response by the user or the like with respect to a query message to the user which is generated when the control unit 2001 executes the program stored in the storage unit 2002.

The input unit 2004 then notifies the control unit 2001 of a content of screen operation by the user.

A decoding unit 2005 performs decoding processing on a picked-up image output from a communication unit 2006 in a compression encoding format such as JPEG or H.264. The decoding unit 2005 then expands the picked-up image on which the decoding processing has been performed to the storage unit 2002.

The communication unit 2006 receives a response from the monitoring camera 1000 via the IP network 1500. The communication unit 2006 also outputs the received response to the control unit 2001. The communication unit 2006 also receives the streaming of video, audio, or the like from the monitoring camera 1000.

The respective internal configurations of the monitoring camera 1000 and the client apparatus 2000 have been described above, but the processing blocks illustrated in FIGS. 2A and 2B are described as the exemplary embodiment of the image pickup apparatus and the external apparatus according to the present invention, and the configurations thereof are not limited to the above-described configurations.

For example, various alterations and modifications can be made within the gist of the present invention in a manner that an audio input unit, an audio output unit, and the like can be provided to the monitoring camera 1000, the client apparatus 2000, and the client apparatus 2100. Similarly, various alterations and modifications can be made within the gist of the present invention in a manner that a pan tilt mechanism and the like for rotating the image pickup unit 1004 in a pan direction and a tilt direction can be provided to the monitoring camera 1000.

Figure 3:
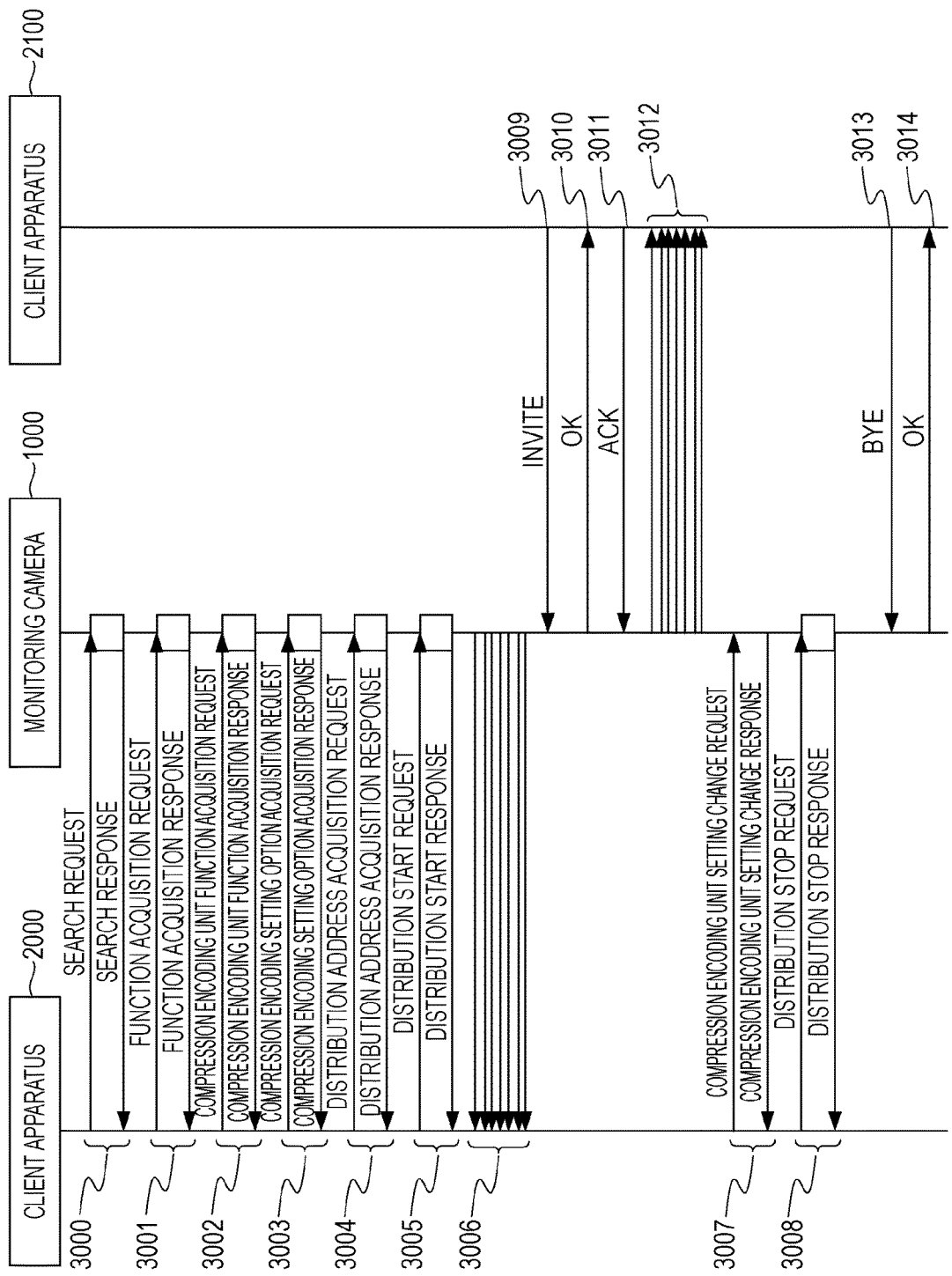
FIG. 3 is a sequence diagram for describing the monitoring camera and the client apparatuses according to the first exemplary embodiment of the present invention.

Subsequently, FIG. 3 is a sequence diagram for describing a typical command sequence from setting start of a parameter of the picked-up image to be distributed by way of streaming until streaming distribution of the picked-up image. This command sequence is performed among the monitoring camera 1000, the client apparatus 2000, and the client apparatus 2100.

In FIG. 3, first, the client apparatus 2000 is connected to the monitoring camera 1000, and the picked-up image is distributed by way of streaming from the monitoring camera 1000 to the client apparatus 2000. Next, the client apparatus 2100 that is different from the client apparatus 2000 is connected to the monitoring camera 1000, and the picked-up image is distributed by way of streaming from the monitoring camera 1000 to the client apparatus 2100. Thereafter, the monitoring camera 1000 stops the streaming distribution.

In this manner, the monitoring camera 1000 according to the present exemplary embodiment may be connected to a plurality of client apparatuses at the same time.

It is noted that communications between the client apparatus 2000 and the monitoring camera 1000 (transactions 3000 to 3008) are set to follow the protocol established by ONVIF in FIG. 3. In addition, communications between the client apparatus 2100 and the monitoring camera 1000 (transactions 3009 to 3014) are set to follow the protocol established by GB28181.

Herein, the protocol established by ONVIF is set to be equivalent to a first protocol according to the present exemplary embodiment. In addition, the protocol established by GB28181 is set to be equivalent to a second protocol that is different from the protocol established by ONVIF according to the present exemplary embodiment.

The transaction according to the present exemplary embodiment refers, for example, to a pair of a command transmitted from the client apparatus 2000 to the monitoring camera 1000 and a response returned to the client apparatus 2000 by the monitoring camera 1000 in response to the relevant command.

First, the command sequence between the client apparatus 2000 and the monitoring camera 1000 will be described.

The transaction 3000 in FIG. 3 is a transaction for a device search. The client apparatus 2000 transmits a search request command including a search condition by way of multicast to search for a monitoring camera connected to the network. The monitoring camera that is matched with the search condition among the monitoring cameras that have received the search request command returns a search response command to the transmission source of the search request command. Accordingly, the connection between the monitoring camera 1000 and the client apparatus 2000 is established.

The transaction 3001 is a transaction for a function acquisition request. The client apparatus 2000 transmits a function acquisition request command to the monitoring camera 1000 that has returned the search response so as to acquire a function supported by the monitoring camera 1000. Herein, the function acquisition request command is a command for acquiring the function supported by the monitoring camera 1000.

The monitoring camera 1000 that has received this function acquisition request command then returns a function acquisition request response to the client apparatus 2000. Accordingly, the monitoring camera 1000 provides a list of functions supported by itself to the client apparatus 2000.

The transaction 3002 is a transaction for a compression encoding unit function acquisition. The client apparatus 2000 transmits a compression encoding unit function acquisition command to the monitoring camera 1000. On the other hand, the monitoring camera 1000 that has received this command returns information related to a function provided by the compression encoding unit 1006 to the client apparatus 2000.

Accordingly, the client apparatus 2000 can acquire the information related to the function provided by the compression encoding unit 1006 of the monitoring camera 1000. This information includes, for example, information indicating the resolution of the picked-up image currently distributed by way of streaming from the monitoring camera 1000, the compression encoding system, and the like.

The transaction 3003 is a transaction for a compression encoding setting option acquisition. The client apparatus 2000 transmits a compression encoding setting option acquisition command to the monitoring camera 1000. On the other hand, the monitoring camera 1000 that has received this command transmits a compression encoding setting option acquisition response to the client apparatus 2000.

Accordingly, the client apparatus 2000 can acquire settable options and a settable range of values with respect to the respective parameters of the compression encoding setting from the monitoring camera 1000. For example, the client apparatus 2000 can acquire options of the compression encoding system (such as JPEG and H.264), options of resolutions of the picked-up image distributed by way of streaming, and the like.

It is noted that the monitoring camera 1000 according to the present exemplary embodiment changes the response of the monitoring camera 1000 in accordance with the communication protocol used by the client apparatus. Details of the above-described operation will be described below.

The transaction 3004 is a transaction for a distribution address acquisition request. The client apparatus 2000 transmits a distribution address acquisition request command to the monitoring camera 1000. On the other hand, the monitoring camera 1000 returns an address for the streaming distribution of the picked-up image or the like to the client apparatus 2000.

The transaction 3005 is a transaction for a distribution start request. The client apparatus 2000 transmits a distribution start request command to the monitoring camera 1000. On the other hand, the monitoring camera 1000 that has received this command starts the streaming distribution of video, audio, or the like with respect to the client apparatus 2000.

It is noted that the client apparatus 2000 receives a streaming ID from the monitoring camera 1000 in the transaction 3005. In addition, the monitoring camera 1000 stores the streaming ID transmitted to the client apparatus 2000 in the storage unit 1002 while being associated with identification information for identifying the currently distributed streaming.

The transaction 3006 is a streaming distributed from the monitoring camera 1000 to the client apparatus 2000. This streaming is continuously performed until the monitoring camera 1000 receives a distribution stop request command in the transaction 3008 or until disconnection or the like of the network occurs.

The transaction 3007 is a transaction for a compression encoding unit setting change. The client apparatus 2000 transmits a compression encoding setting change command to the monitoring camera 1000. On the other hand, the monitoring camera 1000 that has received this command updates the compression encoding setting stored in the storage unit 1002 on the basis of the received command.

Accordingly, the client apparatus 2000 can change the content of the compression encoding setting acquired in the transaction 3002 on the basis of the options or the like acquired in the transaction 3003.

For example, the client apparatus 2000 can change the compression encoding system or the resolution of the picked-up image distributed by way of streaming from the monitoring camera 1000. The monitoring camera 1000 also stores this content of the changed compression encoding setting in the storage unit 1002.

The transaction 3008 is a transaction for a distribution stop. The client apparatus 2000 transmits a distribution stop command to the monitoring camera 1000. Herein, the client apparatus 2000 specifies the streaming ID by this command. This streaming ID is acquired in the transaction 3005.

On the other hand, the monitoring camera 1000 that has received this command reads out the identification information associated with the streaming ID specified by this command from the storage unit 1002 and stops the streaming identified by the read identification information. Accordingly, the client apparatus 2000 can stop the currently distributed streaming by the monitoring camera 1000.

Next, a command sequence between the client apparatus 2100 and the monitoring camera 1000 will be described. Herein, messages in the transactions 3009 to 3011 are processes for establishing an INVITE session.

The transaction 3009 is an INVITE message transmitted from the client apparatus 2100 to the monitoring camera 1000. This message includes a device identification code for identifying the monitoring camera 1000 that receives the message, an identification code for identifying the client apparatus 2100, and the like.

The transaction 3010 is an OK response transmitted from the client apparatus 2100 to the monitoring camera 1000. This message includes information of a media format provided by the monitoring camera 1000 and the like. This media format includes information of the compression encoding format and the resolution of the picked-up image distributed by way of streaming from the monitoring camera 1000.

The transaction 3011 is an ACK message transmitted from the client apparatus 2100 to the monitoring camera 1000. This message includes specification information of the media format and the like. The INVITE session establishment process is completed by the transmission of this message.

The transaction 3012 is a streaming distributed from the monitoring camera 1000 to the client apparatus 2100. This streaming is continuously performed until the monitoring camera 1000 receives a BYE command in the transaction 3013 or until disconnection or the like of the network occurs.

The transaction 3013 is a BYE message transmitted from the client apparatus 2100 to the monitoring camera 1000. This message is for disconnecting the INVITE session established between the monitoring camera 1000 and the client apparatus 2000.

The transaction 3014 is an OK message transmitted from the monitoring camera 1000 to the client apparatus 2100. The monitoring camera 1000 that has transmitted this message disconnects the session with the client apparatus 2100.

Figure 4:
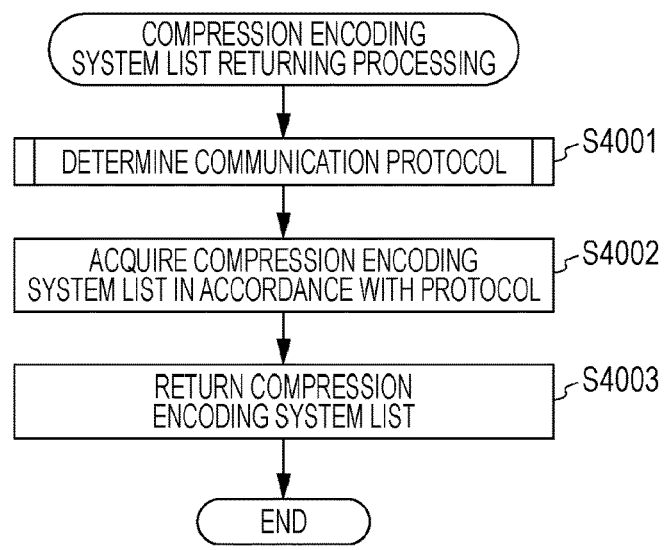
FIG. 4 is a flow chart for describing compression encoding system list returning processing according to the first exemplary embodiment of the present invention.

Subsequently, FIG. 4 is a flow chart for describing compression encoding system list returning processing in the monitoring camera 1000 according to the present exemplary embodiment. This compression encoding system list returning processing is processing of transmitting a list indicating the compression encoding system supported by the monitoring camera 1000 from the monitoring camera 1000 to the client apparatus 2000 and the client apparatus 2100. It is noted that this processing is executed by the control unit 1001.

Herein, the control unit 1001 starts the processing illustrated in FIG. 4 in a case where the compression encoding setting option acquisition command in the transaction 3003 is received via the communication unit 1007 in the communication in conformity to the ONVIF standard. On the other hand, the control unit 1001 starts the processing illustrated in FIG. 4 in a case where the OK message in the transaction 3010 is transmitted via the communication unit 1007 in the communication in conformity to the GB28181 standard.

It is noted that, according to the present exemplary embodiment, the compression encoding setting option acquisition command in the transaction 3003 and the OK message in the transaction 3010 are equivalent to the commands for requesting the capability information.

In addition, according to the present exemplary embodiment, the monitoring camera 1000 supports "JPEG", "H.264", "MPEG-4", and "SVAC (Surveillance Video and Audio Coding)" as the compression encoding system. Herein, SVAC is a system for audio and video compression encoding defined in GB/T25724.

In step S4001 in FIG. 4, the control unit 1001 performs communication protocol determination processing for determining the communication protocol used by the client apparatus that has transmitted the command to the monitoring camera 1000. Herein, a reason why the communication protocol is determined is that, since the compression encoding systems supported by the protocols are different from each other, the option of the compression encoding system that is not supported by the determined communication protocol is not presented to the user.

This communication protocol determination processing will be described below by using a flow chart of FIG. 5.

In step S4002, the control unit 1001 reads out all the compression encoding system information corresponding to the communication protocol determined in step S4001 from the compression encoding system table stored in the storage unit 1002.

Herein, the compression encoding system table according to the present exemplary embodiment stores "ONVIF" as the communication protocol information and "JPEG" and "H.264" as the compression encoding system information while being associated with each other. Furthermore, the compression encoding system table according to the present exemplary embodiment stores "GB28181" as the communication protocol information and "MPEG-4", "H.264", and "SVAC" as the compression encoding system information while being associated with each other.

For example, in a case where the communication protocol determined in step S4001 is "ONVIF", the control unit 1001 reads out the compression encoding system information indicating "JPEG" and "H.264" from the storage unit 1002. On the other hand, in a case where the communication protocol determined in step S4001 is "GB28181", the control unit 1001 reads out the compression encoding system information indicating "MPEG-4", "H.264", and "SVAC" from the storage unit 1002.

It is noted that, according to the present exemplary embodiment, the compression encoding format information indicating "JPEG" and "H.264" is equivalent to first capability information. In addition, according to the present exemplary embodiment, the compression encoding format information indicating "MPEG-4", "H.264", and "SVAC" is equivalent to second capability information different from the first capability information.

In step S4003, the control unit 1001 instructs the communication unit 1007 to transmit the compression encoding system information read in step S4002 to the client apparatus 2000 or the client apparatus 2100 as a list of the compression encoding systems.

Specifically, the control unit 1001 instructs the communication unit 1007 to transmit the list corresponding to the compression encoding system information read in step S4002 to the client apparatus 2000 in a case where the communication protocol determined in step S4001 is "ONVIF".

On the other hand, the control unit 1001 instructs the communication unit 1007 to transmit the list corresponding to the compression encoding system information read in step S4002 to the client apparatus 2100 in a case where the communication protocol determined in step S4001 is "GB28181".

When the above-described compression encoding system list returning processing is performed, it is possible to present the appropriate list of the compression encoding systems to the client apparatus in accordance with the communication protocol.

Figure 5:
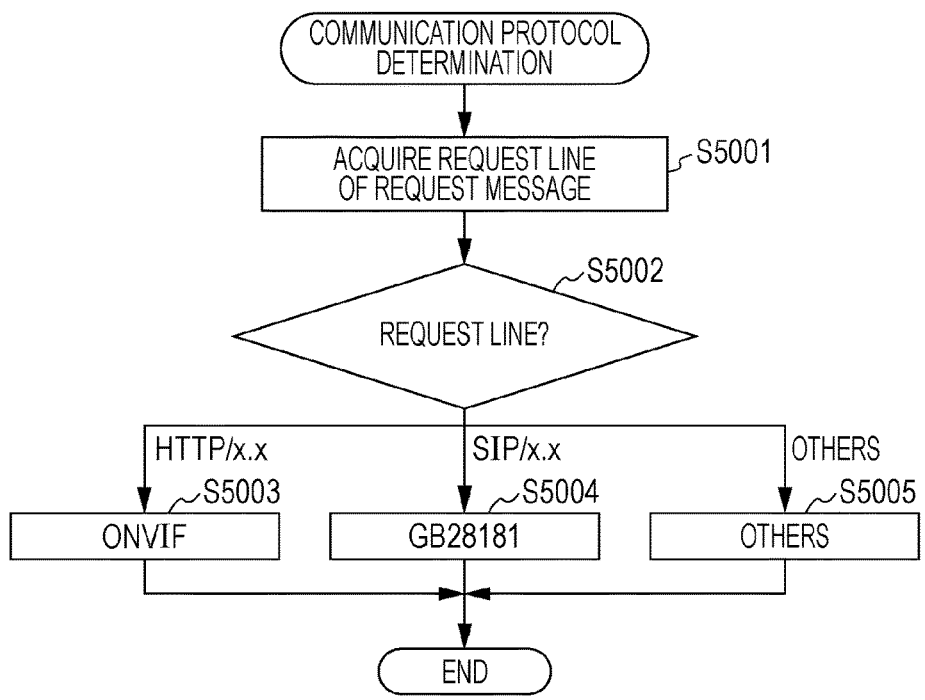
FIG. 5 is a flow chart for describing communication protocol determination processing according to the first exemplary embodiment of the present invention.

Subsequently, FIG. 5 is a flow chart for describing the communication protocol determination processing in the monitoring camera 1000 according to the present exemplary embodiment. It is noted that this processing is executed by the control unit 1001.

In step S5001 in FIG. 5, the control unit 1001 acquires a request line from the command or the message received by the communication unit 1007.

Hereinafter, this request line will be described. A control command for controlling the monitoring camera 1000 is exchanged in conformity to HyperText Transfer Protocol (HTTP) in the case of the ONVIF standard. On the other hand, in the case of the GB28181 standard, this command is exchanged in conformity to Session Initiation Protocol (SIP).

Herein, according to the HTTP protocol or the SIP protocol, the message exchange is performed in a text format. The request line refers to the first line of the message in this text format. It is noted that the request line is also called start line.

For example, the client apparatus 2000 or the client apparatus 2100 transmits a request message to the monitoring camera 1000. On the other hand, the monitoring camera 1000 that has received this request message acquires the first line of the received request message.

In step S5002, the control unit 1001 determines protocol information of the request line acquired in step S5001.

Herein, the request line is constituted by three elements including a method, a request uniform resource identifier (URI), and protocol version information. This protocol version information is described, for example, as "HTTP/1.1" in the case of HTTP, "SIP/2.0" in the case of SIP, or the like.

In a case where the protocol information of the request line acquired in step S5001 is "HTTP/x.x" (x is arbitrary), the control unit 1001 then advances the processing to step S5003. In a case where the protocol information of the request line acquired in step S5001 is "SIP/x.x" (x is arbitrary), the control unit 1001 advances the processing to step S5004.

Furthermore, in a case where the protocol information of the request line acquired in step S5001 is not "HTTP/x.x" and also this information is not "SIP/x.x", the control unit 1001 advances the processing to step S5005.

In step S5003, the control unit 1001 determines that the communication protocol used by the client apparatus that has transmitted the command to the monitoring camera 1000 is the communication protocol in conformity to ONVIF.

In step S5004, the control unit 1001 determines that the communication protocol used by the client apparatus that has transmitted the command to the monitoring camera 1000 is the communication protocol in conformity to GB28181.

In step S5005, the control unit 1001 determines that the communication protocol used by the client apparatus is "the other communication protocol". Herein, "the other communication protocol" is a communication protocol different from the communication protocol in conformity to ONVIF and also different from the communication protocol in conformity to GB28181.

Subsequently, FIG. 6 is a flow chart for describing distribution image setting screen processing for displaying a distribution image setting screen illustrated in FIG. 7A in the client apparatus 2000 that performs the communication with the monitoring camera 1000 in conformity to the ONVIF protocol according to the present exemplary embodiment.

Herein, this distribution image setting screen is a screen used for changing a setting of the picked-up image distributed by way of streaming to the client apparatus 2000 by the monitoring camera 1000. It is noted that the processing illustrated in FIG. 6 is executed by the control unit 2001 of the client apparatus 2000.

In step S6000 in FIG. 6, the control unit 2001 instructs the display unit 2003 to display a distribution image setting window 7000.

In step S6001, the control unit 2001 instructs the communication unit 2006 to carry out the transactions 3000 to 3003 and acquires distribution image information of the picked-up image distributed by way of streaming by the monitoring camera 1000 from the monitoring camera 1000.

For example, this distribution image information includes a list of the compression encoding systems supported by the monitoring camera 1000, a default value of the resolution of the picked-up image distributed by way of streaming by the monitoring camera 1000, a resolution currently set in the monitoring camera 1000 corresponding to this the resolution, and the like.

The control unit 2001 then instructs the display unit 2003 to display a radio button 7003 for selecting the compression encoding system in a setting area 7002 of FIG. 7A on the basis of the acquired list of the compression encoding systems. Two options of the radio button 7003 are constituted by an option for selecting "JPEG" as the compression encoding system and an option for selecting "H.264" as the compression encoding system.

The control unit 2001 also instructs the display unit 2003 to display the acquired default value of the resolution on a Resolution drop down list 7004 in the setting area 7002. "320×240" is displayed on the Resolution drop down list 7004 according to the present exemplary embodiment. It is noted that the Resolution drop down list 7004 according to the present exemplary embodiment is equivalent to a pull down menu.

The control unit 2001 further instructs the display unit 2003 to display a setting button 7005 in the setting area 7002 and also display a close button 7006 in the distribution image setting window 7000.

Herein, the setting button 7005 is a button for setting distribution image capability information that has been set in the distribution image setting window 7000 by the user in the monitoring camera 1000. The close button 7006 is a button for instructing the monitoring camera 1000 to stop the streaming distribution of the picked-up image.

In step S6002, the control unit 2001 instructs the communication unit 2006 to carry out the transactions 3004 and 3005 and receives the picked-up image distributed by way of streaming from the monitoring camera 1000. The control unit 2001 than instructs the display unit 2003 to display an image corresponding to the received picked-up image in a LiveView area 7001.

In step S6003, the control unit 2001 waits for an operation notification of the screen by the user from the input unit 2004 and an event notification from the monitoring camera 1000. When it is determined that the Resolution drop down list 7004 is pressed down by the user, the control unit 2001 then advances the processing to step S6004.

On the other hand, when it is determined that the setting button 7005 is pressed down by the user, the control unit 2001 advances the processing to step S6005. Furthermore, when it is determined that the close button 7006 is pressed down by the user, the control unit 2001 advances the processing to step S6006.

In step S6004, the control unit 2001 instructs the display unit 2003 to display the list of the resolutions acquired in step S6001 as options of the Resolution drop down list 7004.

In step S6005, the control unit 2001 instructs the communication unit 2006 to transmit the command in the transaction 3007 illustrated in FIG. 3 to the monitoring camera 1000. This command in the transaction 3007 corresponds to the content that has been set in the setting area 7002.

For example, in a case where the option of JPEG is selected in the radio button 7003, it is set that the command in the transaction 3007 corresponding to the content that has been set in the setting area 7002 is transmitted from the client apparatus 2000 to the monitoring camera 1000.

As a result of this transmission, the compression encoding format of the picked-up image distributed by way of streaming from the monitoring camera 1000 turns to "JPEG".

More specifically, the compression encoding format included in the compression encoding setting that is stored in the storage unit 1002 is updated to "JPEG". Accordingly, the compression encoding unit 1006 performs the compression encoding processing on the picked-up image output from the image processing unit 1005. The communication unit 1007 performs the streaming distribution of this picked-up image on which the compression encoding processing has been performed.

In step S6006, the control unit 2001 instructs the display unit 2003 to close the screen illustrated in FIG. 7A and terminates the display of this screen. Furthermore, the control unit 2001 instructs the communication unit 2006 to execute the transaction 3008 illustrated in FIG. 3 and stops the streaming distribution of the picked-up image by the monitoring camera 1000.

Subsequently, distribution image setting screen processing for displaying a distribution image setting screen illustrated in FIG. 7B in the client apparatus 2100 where the communication with the monitoring camera 1000 is performed in conformity to the GB28181 protocol will be described by using FIG. 6 again.

Herein, the distribution image setting screen illustrated in FIG. 7B is a screen used for changing the setting of the picked-up image distributed by way of streaming to the client apparatus 2100 by the monitoring camera 1000. It is noted that the processing illustrated in FIG. 6 is executed by the control unit 2001 of the client apparatus 2100. Hereinafter, descriptions of parts overlapped with the above-described distribution image setting screen processing of the client apparatus 2000 will be omitted, and different parts will be described.

In step S6001, the control unit 2001 instructs the communication unit 2006 to carry out the exchange of the messages in the transactions 3009 and 3010 and acquires the distribution image information of the picked-up image distributed by way of streaming by the monitoring camera 1000 from the monitoring camera 1000.

The control unit 2001 then instructs the display unit 2003 to display the radio button 7003 for selecting the compression encoding system in the setting area 7002 of FIG. 7B on the basis of the acquired list of the compression encoding systems. Three options of the radio button 7003 are constituted by an option for selecting "H.264" as the compression encoding system, an option for selecting "MPEG-4" as the compression encoding system, and an option for selecting "SVAC" as the compression encoding system.

The control unit 2001 also instructs the display unit 2003 to display the acquired default value of the resolution on the Resolution drop down list 7004 in the setting area 7002. "352×288" is displayed in the Resolution drop down list 7004 according to the present exemplary embodiment.

In step S6002, the control unit 2001 instructs the communication unit 2006 to transmit the message in the transaction 3011 to the monitoring camera 1000 and receives the picked-up image distributed by way of streaming from the monitoring camera 1000. The control unit 2001 then instructs the display unit 2003 to display the image corresponding to the received picked-up image in the LiveView area 7001.

In step S6006, the control unit 2001 instructs the communication unit 2006 to execute exchange of the messages in the transactions 3013 and 3014 illustrated in FIG. 3 and stops the streaming distribution of the picked-up image by the monitoring camera 1000.

As described above, the monitoring camera 1000 according to the present exemplary embodiment determines the communication protocol used for the communication with the client apparatus on the basis of the protocol version information included in the request line such as the command from this client apparatus. Furthermore, the monitoring camera 1000 transmits the list of the appropriate compression encoding formats in accordance with the determined communication protocol to this client apparatus.

Accordingly, it is possible to avoid presenting the compression encoding format that is not supported by the communication protocol used in the communication by this client apparatus to the user of the client apparatus.

As a result, it is possible to avoid distributing the picked-up image on which the compression encoding has been performed in the compression encoding format by the monitoring camera 1000 to this client apparatus when this user selects the relevant compression encoding format that is not supported by this communication protocol.

Therefore, it is possible to avoid a situation where, since this client apparatus receives the picked-up image on which the compression encoding has been performed in the compression encoding format that is not supported by this communication protocol, this received picked-up image is not displayed in the display unit.

It is noted that, according to the present exemplary embodiment, the control unit 1001 is configured so as to determine the communication protocol used in the communication with the client apparatus in step S5002 on the basis of the protocol information of the request line acquired in step S5001. However, the configuration is not limited to this.

For example, the control unit 1001 may be configured so as to determine the communication protocol used in the communication with the client apparatus in step S5002 on the basis of a URI described in the request line acquired in step S5001. It is noted that, according to the present exemplary embodiment, the URI described in the request line is equivalent to address information.

Herein, the URI described in this request line (hereinafter, which may be referred to as request URI) specifies a resource to which the request is applied. The client apparatus specifies the URI and transmits the command to the monitoring camera 1000, and the monitoring camera 1000 acquires the request URI from this transmitted command.

For example, in a case where the communication is performed in the protocol established by ONVIF, the request URI transmitted at the beginning by the client apparatus 2000 to the monitoring camera 1000 is set as "http://IPAddress/onvif/device_service" according to the standard. After that, the monitoring camera 1000 performs a notification of a request URI destination from the next time as a response to the first command. The client apparatus 2000 transmits the request to the URI received from the monitoring camera 1000 and performs the communication with the monitoring camera 1000 in the protocol established by ONVIF.

For example, the monitoring camera 1000 previously stores a list of the request URIs used in the communication protocol established by ONVIF in the storage unit 1002. Accordingly, the monitoring camera 1000 can determine whether the communication with the client apparatus is the communication defined by the communication protocol established by ONVIF or the other communication on the basis of the URI acquired from the command that has been received from the client apparatus.

On the other hand, in a case where the communication is performed in the communication protocol established by GB28181, since the SIP protocol is used in this communication, the request URI received from the client apparatus 2100 includes sip as in "sip:username@domain", for example. Therefore, in a case where the request URI of the command received from the client apparatus includes "sip", the monitoring camera 1000 can determine GB28181.

That is, in step S5002, the control unit 1001 may be configured so as to determine that the communication with this client apparatus is the communication based on ONVIF in a case where the request URI included in the command received from the client apparatus is the following request URI. That is, the request URI is "http://IPAddress/onvif/device_service".

Furthermore, in step S5002, in a case where the request URI included in the command received from the client apparatus includes the following sip, may be configured so as to the communication with this client apparatus is the communication based on GB28181. That is, the sip is "sip:username@domain".

In addition, the control unit 1001 may be configured so as to determine the communication protocol used in the communication with the client apparatus in step S5002 on the basis of the method described in the request line acquired in step S5001.

Herein, the method is for urging the resource at the request URI to learn how to take action. For example, "GET", "PUT", and the like are used in the HTTP protocol, and "INVITE", "BYE", and the like are used in the SIP protocol.

That is, in step S5002, in a case where the method described in the request line acquired in step S5001 is "GET" or "PUT", the control unit 1001 may be configured so as to determine that the communication with the client apparatus is the communication based on ONVIF.

On the other hand, in step S5002, in a case where the method described in the request line acquired in step S5001 is "INVITE" or "BYE", the control unit 1001 may be configured so as to determine that the communication with the client apparatus is the communication based on GB28181.

Furthermore, in step S5002, the control unit 1001 so as to determine the communication protocol used in the communication with the client apparatus on the basis of both the request URI and the method described in the request line acquired in step S5001.

Moreover, according to the present exemplary embodiment, in step S4002, the control unit 1001 is configured to read out all the compression encoding format information corresponding to the communication protocols determined in step S4001 from the storage unit 1002, but the configuration is not limited to this.

For example, in step S4002, the control unit 1001 may be configured so as to read out all the compression encoding format information corresponding to the communication protocols determined in step S4001 and the resolution information from the storage unit 1002.

For example, when it is determined in step S4001 that the communication protocol is "ONVIF", the control unit 1001 reads out the compression encoding format information indicating "JPEG" and "H.264" and also the resolution information indicating the resolution "320×240" from the storage unit 1002.

When it is determined that the communication protocol is "GB28181" in step S4001, the control unit 1001 reads out the compression encoding format information indicating "H.264", "MPEG-4", and "SVAC" as well as the resolution information indicating the resolution "352×288" from the storage unit 1002.

In the case of the above-described configuration, in step S4003, the control unit 1001 may be configured to instruct the communication unit 1007 to transmit the compression encoding format information read in step S4002 as well as the resolution information read in step S4002 to the client apparatus.

Moreover, in this case, the resolution information indicating the resolution "320×240" is equivalent to the first capability information. Then, according to the present exemplary embodiment, the resolution information indicating the resolution "352×288" is equivalent to the second capability information different from the first capability information. It is noted that this resolution "352×288" is not used in the protocol established by ONVIF but is used in the protocol established by GB28181.

Furthermore, according to the present exemplary embodiment, in the communication in conformity to the GB28181 standard, the control unit 1001 is configured to start the processing illustrated in FIG. 4 when the OK message in the transaction 3010 is transmitted via the communication unit 1007, but the configuration is not limited to this. For example, in the communication in conformity to the GB28181 standard, the control unit 1001 may be configured so as to start the processing illustrated in FIG. 4 in a case where the INVITE message in the transaction 3009 is received via the communication unit 1007.

Second Exemplary Embodiment

Subsequently, the monitoring camera 1000 according to a second exemplary embodiment of the present invention will be described by using FIG. 8. It is noted that the same constituting elements as those according to the above-described exemplary embodiment are assigned with the same reference symbols, and descriptions thereof may be omitted.

Herein, according to the first exemplary embodiment, the communication protocol used in the communication with this client apparatus is determined on the basis of the request line of the command transmitted from the client apparatus. In contrast to this, according to the second exemplary embodiment, the communication protocol used in the communication with this client apparatus is determined on the basis of a port number supported by the command transmitted from the client apparatus.

Figure 8:
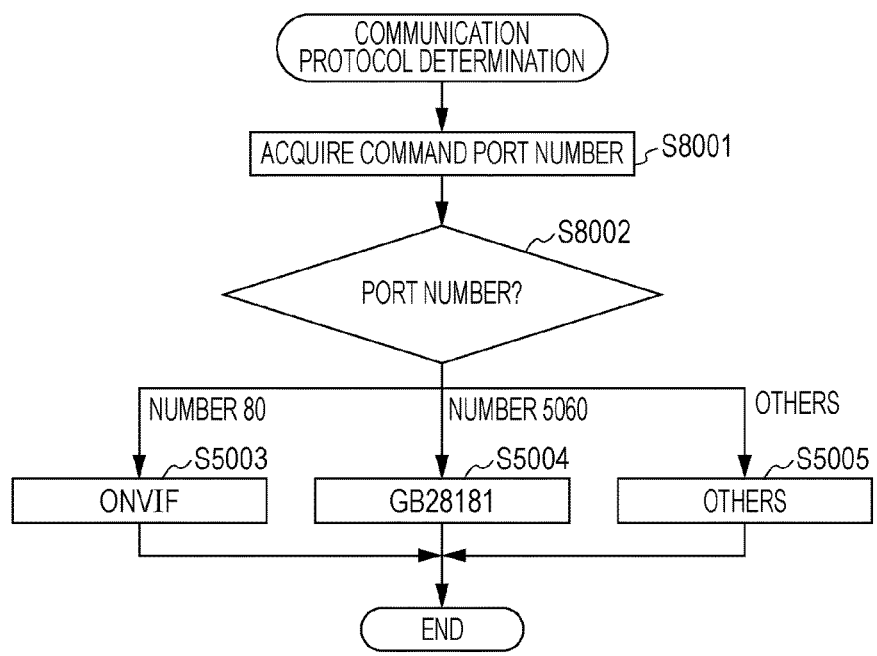
FIG. 8 is a flow chart for describing communication protocol determination processing according to a second exemplary embodiment of the present invention.

Subsequently, FIG. 8 is a flow chart for describing the communication protocol determination processing in the monitoring camera 1000 according to the present exemplary embodiment. It is noted that this flow chart is for describing the communication protocol determination processing in step S4001 according to the present exemplary embodiment in detail. This processing is executed by the control unit 1001.

In step S8001, the control unit 1001 acquires a port number where a command from the client apparatus is accepted. Herein, the port number refers to a number for identifying a program at a communication destination when the communication is performed.

In step S8002, the control unit 1001 determines the port number acquired in step S8001. Specifically, first, the control unit 1001 reads out the communication protocol information corresponding to the port number acquired in step S8001 from the storage unit 1002.

Herein, the storage unit 1002 stores the port number and the communication protocol information while being associated with each other. For example, the storage unit 1002 stores "Number 80" as the port number and "ONVIF" as the communication protocol information while being associated with each other. Furthermore, the storage unit 1002 stores "Number 5060" as the port number and "GB28181" as the communication protocol information while being associated with each other.

For example, the control unit 1001 reads out the communication protocol information associated with the port number acquired in step S8001 from the storage unit 1002. In a case where the read communication protocol information is "ONVIF", the control unit 1001 then determines that the communication protocol corresponding to the port number acquired in step S8001 is ONVIF and advances the processing to step S5003.

In a case where the read communication protocol information is "GB28181", the control unit 1001 determines that the communication protocol corresponding to the port number acquired in step S8001 is GB28181 and advances the processing to step S5004.

Furthermore, a case also occurs where the communication protocol information associated with the port number acquired in step S8001 does not exist in the storage unit 1002, and the control unit 1001 does not read out this information from the storage unit 1002. In this case, the control unit 1001 determines that the communication protocol information corresponding to the port number acquired in step S8001 is neither "ONVIF" nor "GB28181" and advances the processing to step S5005.

As described above, the monitoring camera 1000 according to the present exemplary embodiment determines the communication protocol used in the communication with this client apparatus on the basis of the port number where the command from the client apparatus is accepted. Furthermore, the monitoring camera 1000 transmits the list of the appropriate compression encoding formats in accordance with the determined communication protocol to this client apparatus.

Accordingly, it is possible to avoid the presentation of the compression encoding format that is not supported by the communication protocol used in the communication by this client apparatus to the user of the client apparatus.

As a result, it is possible to avoid the situation where the picked-up image on which the compression encoding has been performed by the monitoring camera 1000 in the compression encoding format that is not supported by this communication protocol is distributed to this client apparatus after this user might have selected the relevant compression encoding format.

Therefore, it is possible to avoid the situation where this received picked-up image is not displayed in the display unit after this client apparatus might have received the picked-up image on which the compression encoding has been performed in the compression encoding format that is not supported by this communication protocol.

It is noted that, according to the present exemplary embodiment, the storage unit 1002 is configured so as to store the port number "Number 80" and "ONVIF" as the communication protocol information while being associated with each other and also store the port number "Number 5060" and "GB28181" as the communication protocol information while being associated with each other. However, the configuration is not limited to this.

For example, a default port number of the command in conformity to the protocol established by ONVIF is Number 80, and a default port number of the command in conformity to the protocol established by GB28181 is Number 5060.

However, a case is also conceivable where the port number of the command in conformity to the protocol established by ONVIF may be changed from the default port number. In the above-described case, the storage unit 1002 may be configured so as to store this changed port number and "ONVIF" as the communication protocol information while being associated with each other.

Similarly, a case is also conceivable where the port number of the command in conformity to the protocol established by GB28181 is changed from the default port number. In the above-described case, the storage unit 1002 may be configured so as to store this changed port number and "GB28181" as the communication protocol information while being associated with each other.

It is noted that according to the above-described exemplary embodiment, the monitoring camera 1000 is configured so as to hold a common resolution table for the different compression encoding systems ("H.264", "SVAC", and "MPEG-4"), but the configuration is not limited to this. For example, the monitoring camera 1000 may be configured so as to hold a dedicated-use resolution table for each of the different compression encoding systems. In the case of the above-described configuration, the monitoring camera 1000 may be configured so as to appropriately distinguish these resolution tables in accordance with the current compression encoding setting.

It is noted that according to the above-described exemplary embodiment, the determination of the protocol is performed on the basis of the port number used in the communication, but the configuration is not limited to this. As an example, the protocol in the communication may be determined on the basis of a point of destination set at the time of the factory shipment or set by a user, a name of a country where the apparatus is used, or the like.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-232393, filed Nov. 8, 2013, which is hereby incorporated by reference herein in its entirety.

What is claimed is:

1. An image pickup apparatus capable of communicating with an external apparatus via a network using a first communication protocol specified by Open Network Video Interface Forum (ONVIF) standard or a second communication protocol specified by GB/T28181 standard, the image pickup apparatus comprising:
   a storage unit configured to store first capability information in a memory, the first capability information being associated with the first communication protocol as capability information and also store second capability information different from the first capability information in the memory, the second capability information being associated with the second communication protocol as the capability information;
   a reception unit configured to receive a command described in the first or second communication protocol for requesting the capability information from the external apparatus via the network;
   a determination unit configured to determine whether the command received by the reception unit is described in the first communication protocol or the second communication protocol;

a reading unit configured to read out the first or second capability information associated with the communication protocol determined by the determination unit from the memory; and a transmission unit configured to transmit the capability information which is associated with the communication protocol determined by the determination unit to the external apparatus via the network using the communication protocol determined by the determination unit before transmitting image data to the external apparatus, wherein the first capability information indicates at least one of image encoding formats supported by the image pickup apparatus in the first communication protocol and the second capability information indicates at least one of image encoding formats supported by the image pickup apparatus in the second communication protocol, wherein the at least one of image encoding formats supported by the image pickup apparatus in the first communication protocol does not include at least Surveillance Video and Audio Coding (SVAC), wherein the at least one of image encoding formats supported by the image pickup apparatus in the second communication protocol includes at least SVAC.

2. The image pickup apparatus according to claim 1, wherein the first capability information and the second capability information includes resolution information.

3. The image pickup apparatus according to claim 1, further comprising:
an image pickup unit configured to pick up an image of a subject; and
a generation unit configured to generate the image data from the picked-up image output from the image pickup unit by using the first capability information and the second capability information read by the reading unit.

4. The image pickup apparatus according to claim 1, wherein the determination unit determines whether the command is in conformity to the first communication protocol or the second communication protocol on the basis of a request line of the command received by the reception unit.

5. The image pickup apparatus according to claim 4, wherein the determination unit determines the communication protocol by using address information included in the request line.

6. The image pickup apparatus according to claim 1, wherein the determination unit determines the first communication protocol or the second communication protocol by using a port number received from the external apparatus.

7. The image pickup apparatus according to claim 1, wherein the first capability information includes at least a part of parameters that the second capability information includes.

8. The image pickup apparatus according to claim 1, wherein the first capability information and the second capability information include resolution information for image signals.

9. The image pickup apparatus according to claim 1, wherein the first capability information and the second capability information include video encoding format information for at least one of an image signal and an audio signal.

10. The image pickup apparatus according to claim 1, further comprising an encoding unit configured to encode at least one of an image signal or an audio signal in a first encoding format corresponding to the first capability information in a case where the determination unit determined that the command received by the reception unit is described in the first communication protocol and in a second encoding format corresponding to the second capability information in a case where the determination unit determined that the command received by the reception unit is described in the second communication protocol.

11. The image pickup apparatus according to claim 10, wherein the transmission unit transmits at least one of an image signal or an audio signal encoded by the encoding unit in one of the first or second encoding format to the external apparatus via the network.

12. The image pickup apparatus according to claim 1, further comprising an encoding unit configured to encode an image signal in a first resolution corresponding to the first capability information in a case where the determination unit determined that the command received by the reception unit is described in the first communication protocol and in a second resolution corresponding to the second capability information in a case where the determination unit determined that the command received by the reception unit is described in the second communication protocol.

13. The image pickup apparatus according to claim 12, wherein the transmission unit transmits at least one of an image signal or an audio signal encoded by the encoding unit in one of the first resolution or the second resolution to the external apparatus via the network.

14. The image pickup apparatus according to claim 12, wherein the first resolution is 352×288.

15. The image pickup apparatus according to claim 12, wherein the resolution in HTTP is smaller than that in SIP.

16. The image pickup apparatus according to claim 12, wherein the encoding unit outputs the image signal with a size of or larger than 320×240 when the communication protocol type is ONVIF.

17. The image pickup apparatus according to claim 12, wherein the encoding unit outputs the image signal with a size of or larger than 320×288 when the communication protocol type is GB/T28181.

18. An image pickup system comprising:
an external apparatus; and
an image pickup apparatus capable of communicating with the external apparatus via a network using either of a first communication protocol specified by ONVIF standard or a second communication protocol specified by GB/T28181 standard,
the image pickup apparatus including
a storage unit configured to store first capability information in a memory, the first capability information being associated with the first communication protocol as capability information and also store second capability information different from the first capability information in the memory, the second capability information being associated with the second communication protocol as the capability information,
a reception unit configured to receive a command described in the first communication protocol or the second communication protocol for requesting the capability information,
a determination unit configured to determine whether the command received by the reception unit is described in the first communication protocol or the second communication protocol,
a reading unit configured to read out the first or second capability information associated with the communication protocol determined by the determination unit from the memory, and a returning unit configured to return the capability information which is associated with the communication protocol determined by the determination unit to the external apparatus via the network using the communication protocol determined by the determination unit before transmitting image data to the external apparatus, and the external apparatus including a transmission unit configured to transmit the command to the image pickup apparatus via the network using the first or the second communication protocol to control the image pickup apparatus, and an acceptance unit configured to accept the first or second capability information returned by the returning unit, wherein the first capability information indicates at least one of image encoding formats supported by the image pickup apparatus in the first communication protocol and the second capability information indicates at least one of image encoding formats supported by the image pickup apparatus in the second communication protocol, wherein the at least one of image encoding formats supported by the image pickup apparatus in the first communication protocol does not include at least SVAC, wherein the at least one of image encoding formats supported by the image pickup apparatus in the second communication protocol includes at least SVAC.

19. The image system apparatus according to claim 18, wherein the external apparatus includes a user interface unit configured to allow a user to set parameters included in the command.

20. A control method for an image pickup apparatus capable of communicating with an external apparatus via a network using either a first communication protocol specified by Open Network Video Interface Forum (ONVIF) or a second communication protocol specified by GB/T28181 standard, the control method comprising:

storing a first communication protocol and a first capability information in a memory, the first capability information being associated with the first communication protocol as capability information and also storing second capability information different from the first capability information in the memory, the second capability information being associated with the second communication protocol as the capability information;

receiving a command described in the first communication protocol or the second communication protocol for requesting the capability information from the external apparatus via the network;

determining whether the command received by the reception unit is described in the first communication protocol or the second communication protocol;

reading out the first or second capability information associated with the communication protocol determined by the determination unit from the memory; and transmitting the capability information which is associated with the communication protocol determined by the determining to the external apparatus via the network using the communication protocol determined by the determination unit before transmitting image data to the external apparatus, wherein the first capability information indicates at least one of image encoding formats supported by the image pickup apparatus in the first communication protocol and the second capability information indicates at least one of image encoding formats supported by the image pickup apparatus in the second communication protocol, wherein the at least one of image encoding formats supported by the image pickup apparatus in the first communication protocol does not include at least Surveillance Video and Audio Coding (SVAC), wherein the at least one of image encoding formats supported by the image pickup apparatus in the second communication protocol includes at least SVAC.

21. A non-transitory computer-readable recording medium on which a computer program for causing a computer to execute the plurality of steps as defined in claim 20 is recorded.

* * * * *